(12) United States Patent
Griffiths et al.

(10) Patent No.: US 10,984,781 B2
(45) Date of Patent: Apr. 20, 2021

(54) IDENTIFYING REPRESENTATIVE CONVERSATIONS USING A STATE MODEL

(71) Applicant: ASAPP, INC., New York, NY (US)

(72) Inventors: Michael Griffiths, Brooklyn, NY (US); Lei Xu, New York, NY (US); Shawn Henry, Longmont, CO (US)

(73) Assignee: ASAPP, INC., New York, NY (US)

( * ) Notice: Subject to any disclaimer, the term of this patent is extended or adjusted under 35 U.S.C. 154(b) by 98 days.

(21) Appl. No.: 16/252,063

(22) Filed: Jan. 18, 2019

(65) Prior Publication Data

US 2020/0234694 A1    Jul. 23, 2020

(51) Int. Cl.
| | | |
|---|---|---|
| *G10L 15/10* | (2006.01) | |
| *G10L 15/06* | (2013.01) | |
| *G10L 15/14* | (2006.01) | |
| *G06F 40/35* | (2020.01) | |
| *G06F 40/30* | (2020.01) | |

(52) U.S. Cl.
CPC .......... *G10L 15/10* (2013.01); *G10L 15/063* (2013.01); *G10L 15/144* (2013.01); *G06F 40/30* (2020.01); *G06F 40/35* (2020.01); *G10L 2015/0631* (2013.01)

(58) Field of Classification Search
CPC ..... G06F 40/00–58; G06F 40/35; G06F 40/30
See application file for complete search history.

(56) References Cited

U.S. PATENT DOCUMENTS

| | | | |
|---|---|---|---|
| 9,715,496 B1 | 7/2017 | Sapoznik et al. | |
| 9,892,414 B1 | 2/2018 | Henry | |
| 9,948,689 B2 * | 4/2018 | Savage | G06Q 50/01 |
| 10,210,244 B1 | 2/2019 | Branavan et al. | |
| 10,236,017 B1 * | 3/2019 | Witt-Ehsani | G10L 15/26 |
| 10,594,757 B1 * | 3/2020 | Shevchenko | G06F 40/35 |
| 2009/0106375 A1 * | 4/2009 | Carmel | G06F 40/194 |
| | | | 709/206 |
| 2011/0238408 A1 * | 9/2011 | Larcheveque | G06F 40/284 |
| | | | 704/9 |

(Continued)

OTHER PUBLICATIONS

"IPsoft Cognitive Platform", Vimeo, https://vimeo.com/154631312 (accessed on May 14, 2019), 2016, 2 pages.

(Continued)

*Primary Examiner* — Matthew H Baker
(74) *Attorney, Agent, or Firm* — GTC Law Group PC & Affiliates

(57) ABSTRACT

A plurality of conversations may be processed to obtain one or more representative conversations to allow a better understanding of the plurality of conversations. A representative conversation may be determined by representing each conversation as a sequence of states where a state may represent messages with similar meanings. Distances may be computed between pairs of conversations, and the conversations may be clustered using the distances. To obtain a representative conversation for a cluster of conversations, a representative sequence of states may be obtained for the cluster and a representative message may be obtained for each state of the sequence of states. The representative conversation may then be presented to a user.

21 Claims, 8 Drawing Sheets

(56) References Cited

U.S. PATENT DOCUMENTS

2011/0238409 A1* 9/2011 Larcheveque ...... G10L 15/1815
704/9
2018/0331839 A1 11/2018 Gao et al.

OTHER PUBLICATIONS

"Process mining", Wikipedia, https://en.wikipedia.org/wiki/Process_mining, accessed on May 13, 2019, 6 pages.

Anderl, et al., "Mapping the customer journey: A graph-based framework for online attribution modeling", SSRN, https://papers.ssrn.com/sol3/papers.cfm?abstract_id=2343077, accessed on May 13, 2019, Oct. 18, 2014, 36 pages.

Barzilay, et al., "Catching the Drift: Probabilistic Content Models, with Applications to Generation and Summarization", HLT-NAACL 2004: Main Proceedings, Association for Computational Linguistics, Boston, Massachusetts, USA, https://www.aclweb.org/anthology/N04-1015, May 2-7, 2004, pp. 113-120.

Beaver, et al., "An Annotated Corpus of Relational Strategies in Customer Service", arXiv:1708.05449v1 [cs.CL], https://arxiv.org/pdf/1708.05449.pdf, Aug. 17, 2017, 19 pages.

Beedkar, et al., "DESA: Frequent Sequence Mining with Subsequence Constraints", arXiv:1609.08431v2 [cs.DB], https://arxiv.org/pdf/1609.08431.pdf, Oct. 13, 2016, 12 pages.

Driemel, et al., "Locality-sensitive hashing of curves", arXiv:1703.04040v1 [cs.CG], https://arxiv.org/pdf/1703.04040v1.pdf, Mar. 11, 2017, 19 pages.

Driemel, "Two Decades of Algorithms for the Frechet distance", TU/e Technische Universiteit Eindhoven University of Technology, https://www.win.tue.nl/~adriemel/shonan2016.pdf, accessed May 13, 2019, May 30, 2016, 124 pages.

Fradkin, et al., "Mining sequential patterns for classification", Knowledge and Information Systems, vol. 45, issue 3, Dec. 2015, pp. 731-749.

Miller, "FortressIQ raises $12M to bring new AI twist to process automation", TechCrunch, https://techcrunch.com/2018/12/04/fortressiq-raises-12m-to-bring-new-ai-twist-to-process-automation/, accessed May 13, 2019, Dec. 4, 2018, 5 pages.

Paek, et al., "Automating spoken dialogue management design using machine learning: An industry perspective", Speech Communication, vol. 50, 2008, pp. 716-729.

Pryzant, et al., "Deconfounded Lexicon Induction for Interpretable Social Science", 16th Annual Conference of the North American Chapter of the Association for Computational Linguistics (NAACL), https://nlp.stanford.edu/pubs/pryzant2018lexicon.pdf, accessed on May 13, 2019, 2018, 11 pages.

Radford, et al., "Learning to Generate Reviews and Discovering Sentiment", arXiv:1704.01444v2 [cs.LG], https://arxiv.org/pdf/1704.01444.pdf, Apr. 6, 2017, 9 pages.

Song, et al., "Uncovering Characteristic Paths to Purchase of Consumer Populations", Boston University Questrom School of Business Research Paper No. 2619674, available at SSRN: https://ssrn.com/abstract=2619674 or http://dx.doi.org/10.2139/ssrn.2619674, accessed May 13, 2019, Jan. 5, 2017, 51 pages.

Wen, et al., "Latent Intention Dialogue Models", Proceedings of the 34th International Conference on Machine Learning, Sydney, Australia, 2017, arXiv:1705.10229v1 [cs.CL] May 29, 2017, https://airxiv.org/pdf/1705.10229.pdf, 10 pages.

Williams, et al., "The Dialog State Tracking Challenge Series: A Review", Dialogue & Discourse 7(3), https://pdfs.semanticscholar.org/4ba3/39bd571585fadb1fb1d14ef902b6784f574f.pdf, 2016, pp. 4-33.

Zhai, et al., "Discovering Latent Structure in Task-Oriented Dialogues", Proceedings of the 52nd Annual Meeting of the Association for Computational Linguistics, Baltimore, Maryland, USA, Jun. 23-25, 2014, pp. 36-46.

U.S. Appl. No. 16/035,062, filed Jul. 13, 2018, 53 pages.
U.S. Appl. No. 16/189,613, filed Nov. 13, 2018, 56 pages.

* cited by examiner

| Conversation ID | Date/Time | Customer ID | Agent ID | Messages |
|---|---|---|---|---|
| con_1001 | 2018-12-18 at 3:40 PM | cus_4518 | agt_0176 | "Hello, could you please help..." |
| con_1002 | 2018-12-18 at 3:41 PM | cus_2928 | agt_5287 | "my internet is not working" |
| con_1003 | 2018-12-18 at 3:42 PM | cus_9187 | agt_3491 | "Anyone there?" "Yes, how can..." |
| ... | | | | ... |

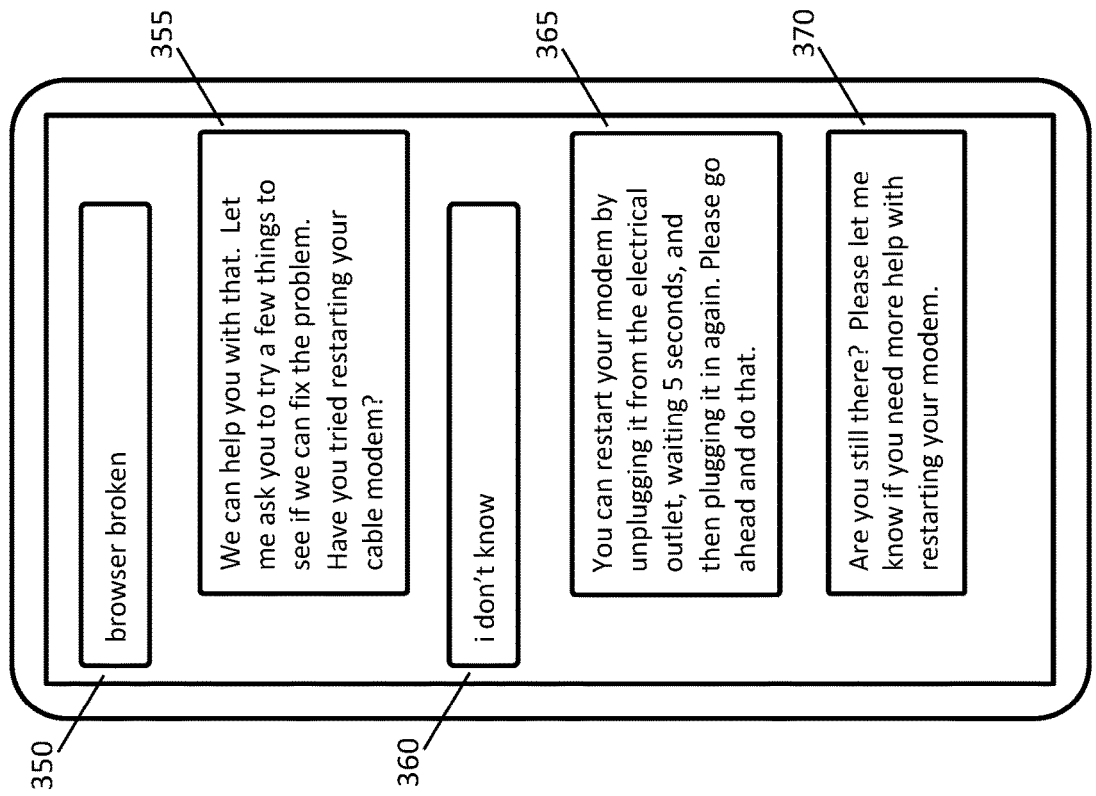
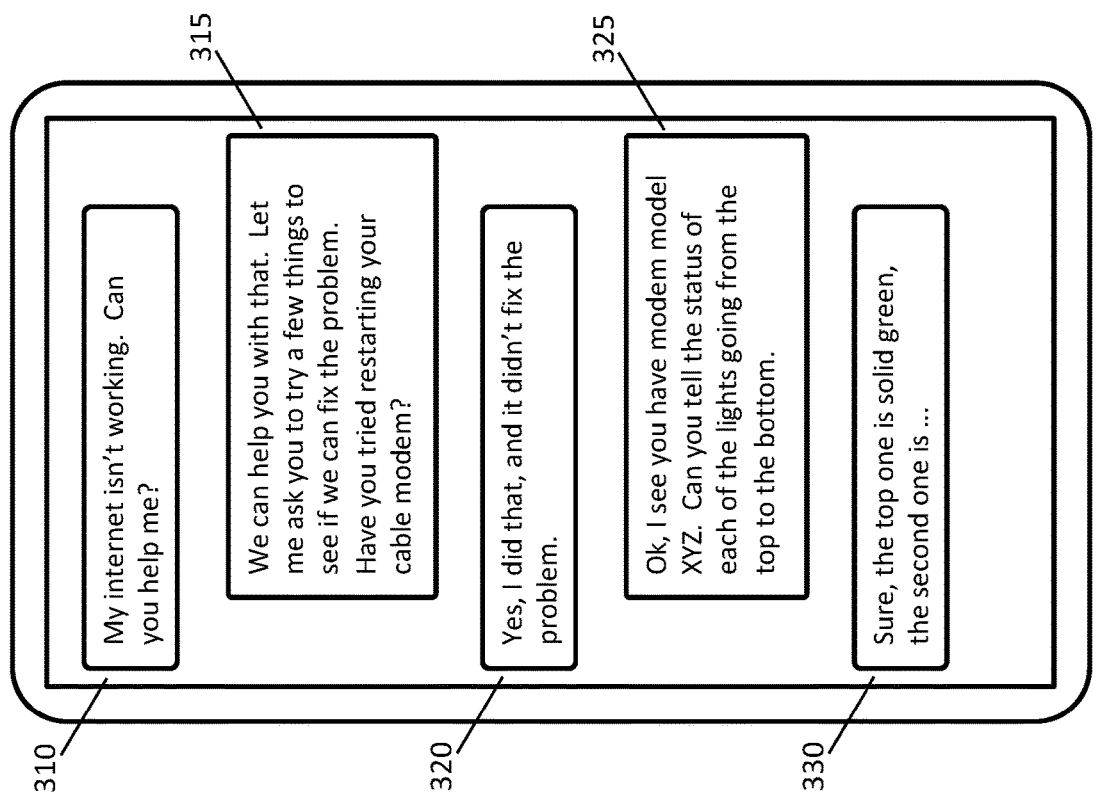
Fig. 3B
Fig. 3A

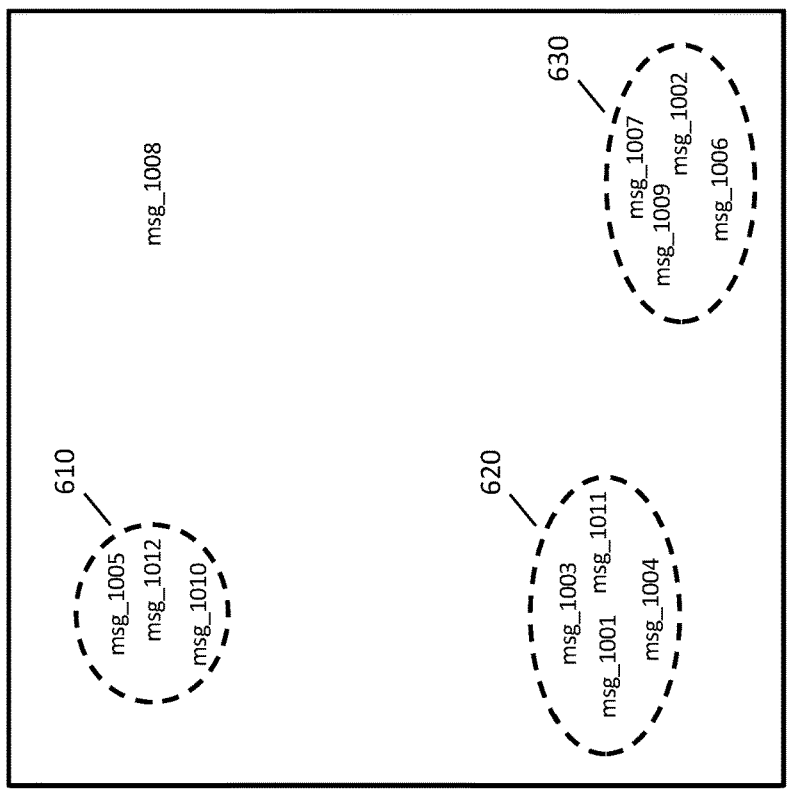

| Cluster ID | % conversations | % time | % resolved | %CSAT | Description |
|---|---|---|---|---|---|
| 1 | 19% | 16% | 95% | 90% | Customer instructed to restart modem |
| 2 | 12% | 13% | 80% | 65% | Scheduled technician visit to replace modem |
| 3 | 9% | 14% | 0% | 0% | Customer abandoned the session |
| 4 | 7% | 4% | 40% | 10% | Outage in customer's area |
| ... | | | | | |

Cluster 1

Number of Conversations: 456 (19%)
Agent Time: 38 hours (16%)
% Resolved: 95%
%CSAT: 90%

Representative Conversation:
1. My internet isn't working.
2. I can help you with that. As a first step, have you tried restarting your modem?
3. No, I have not.
4. Please unplug your modem and then plug it in again.
5. ...

Fig. 10A

Cluster 4

Number of Conversations: 168 (7%)
Agent Time: 9 hours (4%)
% Resolved: 40%
%CSAT: 10%

Representative Conversation:
1. My internet isn't working.
2. Sorry about that. I see that we have outage in your area caused by a fallen tree.
3. We expect to have your service up and running again by 3pm this afternoon.
4. ...

Fig. 10B

IDENTIFYING REPRESENTATIVE CONVERSATIONS USING A STATE MODEL

FIELD OF THE INVENTION

The present invention relates to identifying representative or typical conversations from a corpus of conversations by processing the corpus of conversations with a state model.

BACKGROUND

In a variety of applications, a collection or corpus of conversations may be available, and it may be desired to categorize the conversations or identify common, typical, or representative conversations from the corpus. For example, a company that provides support to its customers may have logs of its customer support process that may include conversations between customers and customer service representatives. The company may desire to better understand the subject matter of the conversations, for example, to improve the customer support process.

Two conversations about the same subject matter may have a variety of different conversation flows. For example, a first conversation may include extended pleasantries before addressing the subject matter of the conversation, while a second conversation may skip the pleasantries and get right to the point of the conversation. For another example, a conversation may include digressions, such as a person telling a story.

Two conversations about the same subject matter may also use different language. For example, a first conversation seeking support for home Internet not working may describe the situation as the Internet not working while a second conversation seeking the same type of support may describe the situation as the web browser malfunctioning.

To identify representative conversations in a corpus of conversations, it may be desired to compare conversations in a manner such that conversations about the same subject matter may be recognized as similar even though the conversations have different flows and use different language.

BRIEF DESCRIPTION OF THE FIGURES

The invention and the following detailed description of certain embodiments thereof may be understood by reference to the following figures:

FIGS. 3A and 3B are example conversations between two users.

FIG. 6 is a conceptual representation of message embeddings for messages of conversations.

FIG. 7 is an example matrix of pairwise distances of conversations.

FIGS. 10A and 10B illustrate example user interfaces for presenting representative conversations to a user.

DETAILED DESCRIPTION

A corpus of conversations may include valuable information, but extracting the valuable information from the corpus of conversations may not be straightforward to achieve. For example, a corpus of conversations may contain a large amount of data, such that it is not practical or cost effective for people to review the conversations to extract information. Automated techniques may be used to extract information, but because conversations may have varying flows (e.g., different ordering of messages in exchanging relevant information) and varying language, automated techniques may not perform well in extracting information from conversations. Accordingly, techniques are needed for obtaining information from a corpus of conversations that are able to recognize two conversations as having similar subject matter even if the two conversations have different flows and use different language.

Conversations between people may arise in a variety of situations and use a variety of techniques. For example, a person may type or speak a message to an app running on his device, type or speak a message on a web page, send a text message, or send an email. As used herein, a text message includes any message sent as text including but not limited to a message sent using SMS (short message service) or a special-purpose application (e.g., Facebook messenger, Apple iMessage, Google Hangouts, or WhatsApp). People may exchange messages for any appropriate purpose, such as social interactions, business interactions, or to request customer support from a company. A corpus of conversations may be obtained for a variety of applications, and the techniques described herein may be used for processing any type of conversation for any application, but for clarity of presentation, conversations relating to customer support will be used as an example.

Figures 1, 2:
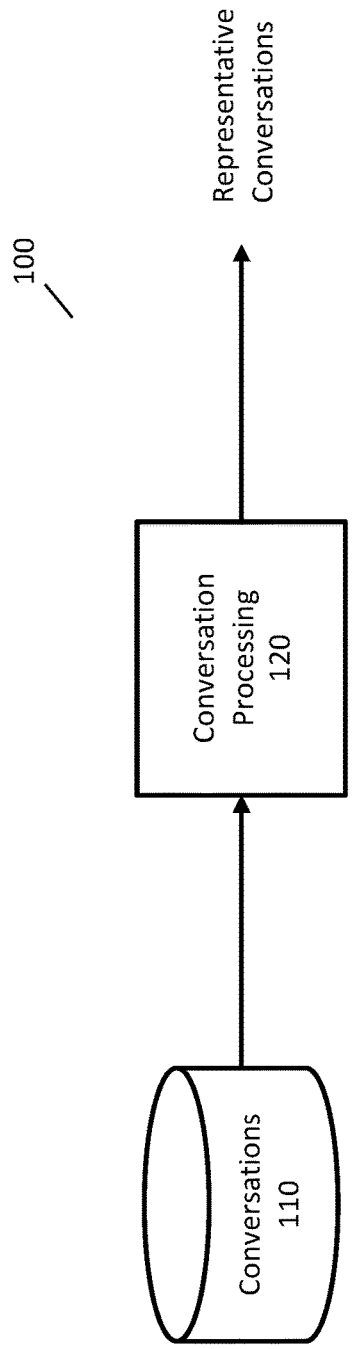
FIG. 1 is an example system for processing a corpus of conversations to determine one or more representative conversations.
FIG. 2 is an example list of conversations.

FIG. 1 is an example system 100 for processing a corpus of conversations to obtain information about representative conversations. In system 100, conversations data store 110 may store information about conversations, such as text of messages exchanged between the people participating in the conversation. In some implementations, conversations data store 110 may be a log of customer support sessions of a company. Conversation processing component 120 may process conversations from conversations data store 110 to obtain information about representative conversations.

The information about representative conversations may include any information that assists a person in understanding the types or subject matter of conversations in conversations data store 110. The information about representative conversations may include, for example, text of messages of representative conversations and statistics of conversations.

For example, where the conversations relate to customer support, the information about representative conversations may indicate that 19% of the conversations relate to a customer seeking technical support for problems with an Internet connection where the problem was resolved by the customer being instructed to restart his modem. The information about representative conversations may also include a sequence of messages that are typical or representative of this category of conversations.

The information about representative conversations may be used for a variety of purposes. In some implementations, the information may be used to better understand the customer support process to identity customer support actions that may be automated instead of handled by a customer service representative. For example, an automated workflow may be implemented to allow customers to troubleshoot problems with their Internet connection, and a step of this workflow may include instructing the customer to restart his modem. In some implementations, the information may be used to identify unexpected events. For example, where a large number of customers are suddenly reporting problems with their Internet connection, then the company may use this information, to learn that an event occurred that is impacting customer Internet connections (e.g., a downed wire) and take actions to solve the problem. In some implementations, the information may be used to improve training of customer service representatives.

FIG. 2 is an example list of conversations that may be stored, for example, in conversations data store 110. In FIG. 2, each row represents a conversation, and each column represents information about the conversations. Any appropriate information may be stored about a conversation. For example, a conversation may include a conversation ID for easier reference to an individual conversation, a date and time, a duration, an ID of people participating in the conversation (e.g., customers and customer service representatives or agents), and the text of messages exchanged during the conversation.

FIGS. 3A and 3B illustrate messages of two example conversations between a customer and a customer service representative where the customer is seeking assistance with his Internet connection. These two conversations provide an example of how two conversations about a similar topic may use different language and have a different conversation flow.

In the conversation of FIG. 3A, the customer is sending messages in complete sentences. At message 310, the customer explains the problem. At message 315, the customer service representative asks the customer to perform an action. At message 320, the customer responds that he performed the action but that it did not solve the problem. The conversation then continues with message 325 and message 330.

In the conversation of FIG. 3B, the customer does not write in complete sentences, and at message 350 the customer states "internet broken". At message 355, the customer service representative asks the customer to perform an action, but at message 360 the customer responds with an uninformative message. At message 365 and message 370 the customer service representative attempts to provide further assistance to the customer, but the customer has abandoned the conversation and does not respond.

Conversation State Model

To identify representative conversations from a corpus of conversations, two conversations may be processed to determine how close or how similar the two conversations are to each other. In some implementations, a state model may be used to compare two conversations. A state model may represent a conversation as a sequence of states, such as assigning a state to each message exchanged during the conversation. A state may be assigned to any appropriate portion of the conversation, such as to a phrase, a sentence, a message (which may be less or more than a sentence), or multiple sentences or messages. For clarity of presentation, assigning a state to message will be used as an example in the following description. A message may correspond to any quantity of communication sent from one user to another. For example, a message may be the content of a transmission (e.g., each time a user selects a "send" button), a sentence sent by a user, or all communications sent by a user until receiving a response from another user (e.g., a turn in the conversation).

Figure 4A:
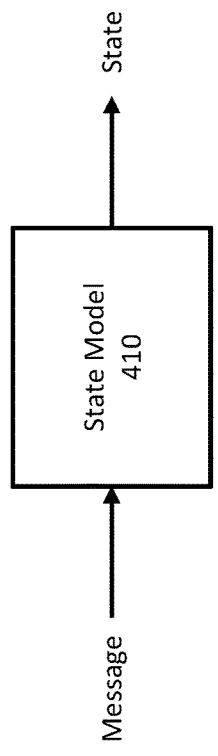
FIGS. 4A and 4B are example state models for assigning states to messages of a conversation.
Figure 4B:
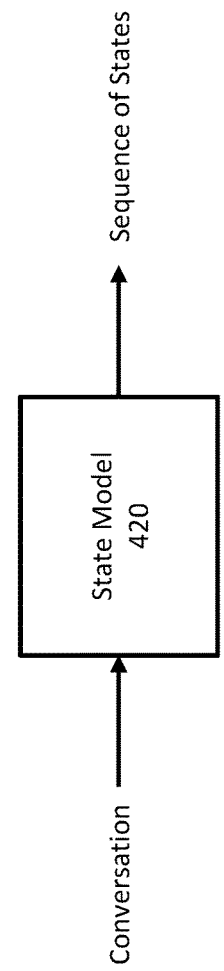

FIGS. 4A and 4B represent two different types of state models. In FIG. 4A, state model 410 processes a message and outputs a state corresponding to the message. With state model 410, a state for a message may be computed independently of other messages in the conversation. In FIG. 4B, state model 420 processes a conversation (e.g., a sequence of messages) and outputs a sequence of states where each state corresponds to a message of the conversation. In FIG. 4B, the state of a message may depend, in part, on one or more previous or subsequent messages in the conversation.

Figure 5A:
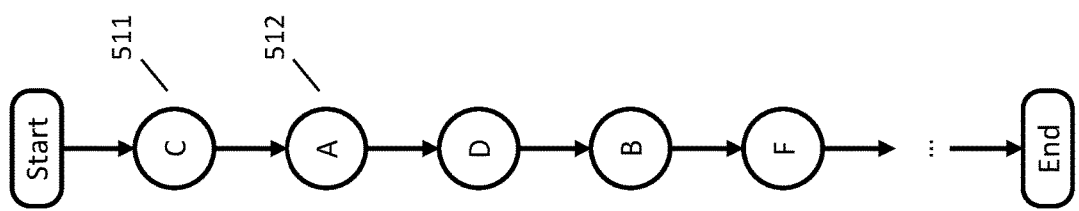
FIGS. 5A and 5B are example sequences of states for two conversations.
Figure 5B:
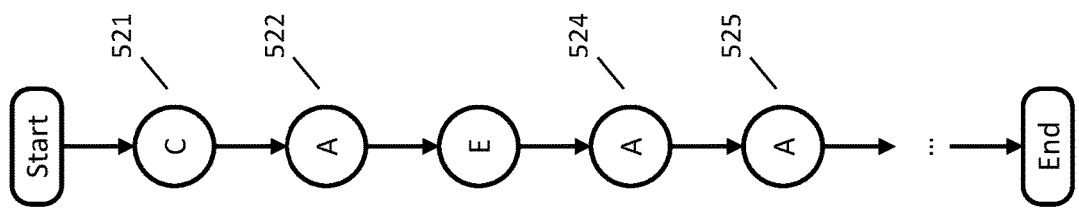

FIGS. 5A and 5B represent sequences of states that may correspond to conversations, such as the conversations of FIGS. 3A and 3B. For example, the initial states 511 and 521, denoted as C, may correspond to messages relating to a customer needing help with Internet connectivity problems (compare with messages 310 and 350). The states 512, 522, 524, and 525, denoted as A, may correspond to messages relating to a customer service representative asking a customer to restart a modem (compare with messages 315, 355, 365, and 370). Similarly, the other states of FIGS. 5A and 5B may correspond to other types of messages.

The sequences of states of two conversations may be used to compare the two conversations with each other (e.g., determine a similarity or compute a distance). Before providing further details about comparing conversations, further details will be provided about example implementations of assigning states to messages.

Any appropriate techniques may be used to assign a state to a message. As used herein, a state of a state model includes any indication of the content or subject matter of a message. For example, the states may be determined by a person, may be learned from processing conversation data (e.g., using hidden Markov models as described below), or may be the output of a classifier that processes a message or a conversation. Although states may be determined or assigned using a graph (e.g., a hidden Markov model), a state need not have any association with a graph. A state may be referred to as a label that indicates the content or subject matter of a message.

In some implementations, states may be assigned to messages using a classifier. A classifier may be created that processes a message and outputs a score for each state that indicates a match between the message and each state. The state having the highest score may then be assigned to the message. For example, the classifier may be implemented using a neural network.

In some implementations, states may be assigned to messages by computing a message embedding for a message. A message embedding is a vector in an N-dimensional vector space that represents the message but does so in a manner that preserves useful information about the meaning of the message. For example, the message embeddings of messages may be constructed so that messages with similar meanings or categories are close to one another in the N-dimensional vector space. For example, the message embeddings for "Hello" and "Good morning" may be close to each other because they have similar meanings.

A state may be assigned to a message using the message embedding. For example, a state may be represented by a state embedding that represents the state in the same N-dimensional space as the message embeddings. A state may then be assigned to a message by selecting a state whose state embedding is closest to the message embedding of the message. Any appropriate techniques may be used to compute a message embedding that represents the meaning of a message and a state embedding that represents a state, such as any of the techniques described below.

In some implementations, a message embedding for a message may be computed by obtaining word embeddings for each word in the message and computing the message embedding from the word embeddings. A word embedding is a vector in an N-dimensional vector space that represents the word but does so in a manner that preserves useful information about the meaning of the word. For example, the word embeddings of words may be constructed so that words with similar meanings or categories are close to one another in the N-dimensional vector space. For example, the word embeddings for "cat" and "cats" may be close to each other because they have similar meanings, and the words "cat" and "dog" may be close to each other because they both relate to pets. Word embeddings may be trained in advance using a training corpus, and a lookup may later be performed to obtain a word embedding for each word of the conversation.

Any appropriate techniques may be used to compute word embeddings from a training corpus. For example, the words of the training corpus may be replaced with a vocabulary index where the vocabulary index indicates the position of the word in the vocabulary (e.g., that is sorted alphabetically). The word vocabulary indices may then be processed using any appropriate techniques, such as the techniques implemented in Word2Vec, GloVe, or fastText software. A word embedding may accordingly be created for each word in the training corpus.

In some implementations, a message embedding for a message may be computed as an average (or some other statistic) of the word embeddings of the words of the message. For example, state model 410 of FIG. 4A may receive a message, obtain word embeddings for the words of the message, and compute a message embedding as an average of the word embeddings.

In some implementations, a message embedding for a message may be computed using a language model, such as a neural network language model. A message may processed by a neural network language model, and the message embedding may be constructed using the final hidden state of the neural network language model. For example, the message embedding may be the final hidden state or a processed version of the final hidden state.

In some implementations, the message embeddings for a conversation may be processed so that each message embedding has contextual information about previous or subsequent messages. Any appropriate techniques may be used to add contextual information to a message embedding. For example, the message embeddings may be processed with a skip-thought neural network that uses a sequence model to predict previous and subsequent messages from a current message. For another example, techniques, such as InferSent and BERT, that combine language modeling with contextual similarity may also be used.

Any of the above techniques may be used to compute a message embedding of a message. As indicated above, to assign a state to a message, a message embedding of a message may be compared to the state embeddings of a set of possible states. In some implementations, the states and their state embeddings may be determined by processing the message embeddings of the corpus of conversations. Example techniques for determining states and state embeddings are now described.

FIG. 6 illustrates example message embeddings in a two-dimensional vector space. In practice, message embeddings may have a larger dimension, but for clarity of presentation, two dimensions are illustrated. In FIG. 6, a label for each message is shown in the location of the corresponding message embedding.

The message embeddings may be clustered to determine a set of states. For example, the messages of FIG. 6 may be clustered into cluster 610, cluster 620, and cluster 630. In this example, msg_1008 may be its own cluster or may be discarded and not part of any cluster. Because the message embeddings represent the meaning of the messages, messages that are close to each other in FIG. 6 may have similar content or meaning. For example, cluster 610 may correspond to messages relating to a customer needing help with Internet connectivity problems. Any appropriate clustering techniques may be used, such as hierarchical clustering, centroid-based clustering (e.g., k-means), or density-based clustering.

In some implementations, a state may be created for each cluster. For example, a state embedding may be computed as the average of the message embeddings of the messages of the cluster. The state embeddings may then be used to assign a state to a message, for example, by computing a distance between the message embedding of the message and the state embeddings.

In some implementations, states may be assigned to messages using a hidden Markov model (HMM). An HMM may be initialized with a desired number of states (e.g., 50-500 states) where it is possible for any state to transition to any other state. The HMM may then be trained by processing the corpus of conversations for which it is desired to determine representative conversations. During the training process, messages with similar content or meaning may be assigned to the same state so that, in a sense, the HMM clusters similar messages to the same state.

Any appropriate techniques may be used to implement an HMM to assign states to messages. In some implementations, an HMM topic model may be used to assign states to messages. An HMM topic model may use a topic model to describe the content of messages, where a topic model is a representation of multiple topics that are present in a corpus of messages. Any appropriate topic model may be used, such as a probabilistic topic model.

In some implementations, a topic may be a probability distribution over a vocabulary of words, and a topic model may be a collection of two or more topic distributions. The vocabulary may be determined from the messages being processed. For example, the vocabulary of words may include a number of most frequent words (but perhaps excluding words that relate to all topics, such as prepositions). For example, a topic model that relates to messages about Internet connection problems may have a higher probability for words such as "Internet", "connection", "browser", and "slow". Any appropriate techniques may be used to determine a topic model from a corpus of messages, such as latent Dirichlet allocation.

Each state of an HMM topic model may be associated with a distribution over topics. In some implementations, a distribution over topics may be represented as a vector where each element indicates a degree to which a topic applies to messages corresponding to the state. For example, each element of the vector may be a number between 0 and 1, and the vector may sum to 1.

A corpus of conversations may be processed to train the parameters of the HMM topic model. For example, each message of each conversation may be represented by a feature vector, such as a bag-of-words feature vector, and the training procedure may process the feature vectors of the messages. Any appropriate training techniques may be used to train the parameters of the HMM topic model, such as the forward-backward algorithm or the Baum-Welch algorithm. The parameters of the HMM topic model may include, for example, transition probabilities between pairs of states, a distribution over topics for each state, and a distribution over words for each topic.

During the process of training the HMM topic model, each message of each conversation may be assigned to a state of the HMM topic model. Each conversation may then be represented by the sequence of states corresponding to the sequence of messages of the conversation.

Accordingly, using any of the techniques described herein, each conversation may be represented by a sequence of states. This representation of conversations may facilitate the comparison of conversations with each other, as described in greater detail below.

Clustering Conversations

To identify representative conversations from a corpus of conversations, the conversations may be clustered to identify conversations with similar content or subject matter. Any appropriate techniques may be used to cluster conversations. In some implementations, conversations may be clustered using a function that processes two conversations to compute an indication of the similarity of the content or subject matter of the two conversations. Any appropriate function may be used to determine a similarity between two conversations.

In some implementations, a similarity between two conversations may be determined by processing the sequence of states for each conversation. For example, a first conversation may be represented by a first sequence of states, a second conversation may be represented by a second sequence of states, and the similarity of the conversations may be determined by processing the first and second sequences of states.

Any appropriate techniques may be used to compute a similarity of two conversations by processing the corresponding sequences of states. In some implementations, an optimal transport distance may be computed between the two sequences of states. For example, the distance between the sequences of states may be a Frechet distance, a Wasserstein distance, or a Levenstein distance.

In comparing two sequences of states, a matrix may be created where the number of rows corresponds to the number of states of the first sequence and the number of columns corresponds to the number of states of the second sequence. For each element of the matrix, a distance may be computed between the corresponding states, and an optimal path through the matrix may be determined (e.g., from the top-left element to the bottom-right element).

Any appropriate techniques may be used to compute a distance between two states. For the Frechet and Wasserstein distances, a transport cost may be defined between a pair of states. For example, where states are represented by a state embedding, the distance between two states may be the distance between their state embeddings (e.g., a Euclidean distance). For another example, where the states are obtained using an HMM topic model, the distance between two states may be computed using the distributions over topics for the two states (e.g., a Shannon divergence or a Hellinger distance).

Accordingly, a distance or similarity may be computed between each pair of conversations. FIG. 7 illustrates a matrix of pairwise distances for a corpus of conversations. In the example of FIG. 7, the distance between conversation con_1001 and con_1002 is 82. In FIG. 7 the diagonal is crossed out because a distance between a conversation and itself may be presumed to be 0. Similarly, the lower triangle is crossed out because the distances may be symmetric and thus the same as the upper triangle.

The pairwise distances between conversations may be used to cluster the conversations. For example, two conversations with a small distance may be in the same cluster, and two conversations with a large distance may be in different clusters. Any appropriate techniques may be used to cluster the conversations, such as density-based clustering or hierarchical clustering.

Figures 8, 9:
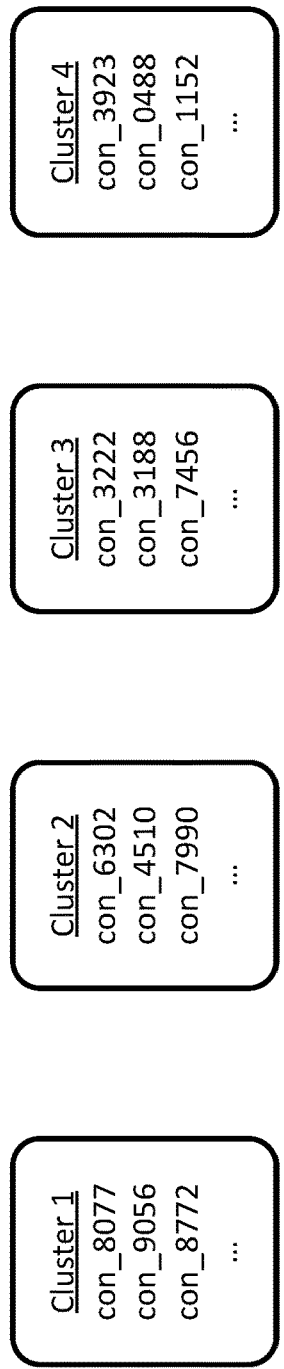
FIG. 8 illustrates example clusters of conversations.
FIG. 9 illustrates example summary information for clusters of conversations.

FIG. 8 illustrates examples of conversation clusters that may be determined by using pairwise distances between conversations. In the example of FIG. 8, four clusters are shown with example IDs of conversations corresponding to the cluster.

Representative Conversation for a Cluster

The clustering of conversations may be performed on a large corpus of conversations. Accordingly, the number of conversations in each cluster may be large. To facilitate further understanding of the clusters of conversations, it may be desired to determine or obtain one or more representative conversations for one or more clusters. The representative conversations of a cluster may allow a person to understand the types of conversations that are present in a cluster.

Any appropriate techniques may be used to obtain a representative conversation for a cluster. In some implementations, a conversation may be selected randomly from the cluster as a representative conversation. In some implementations, a representative conversation may be selected as the conversation of a cluster with the smallest average distance to other conversations in the cluster (e.g., a conversation near the center of the cluster).

In some implementations, a representative conversation for a cluster may be determined by selecting a representative sequence of states for the cluster and then selecting a representative message for each state of the representative sequence of states. Any appropriate techniques may be used to determine a representative sequence of states for a cluster, and then for selecting a representative message for each state.

In some implementations, a representative sequence of states for a cluster may be determined by selecting a subset of states as being most important or salient for a cluster and then ordering the subset of states. Any appropriate techniques may be used to select a subset of salient states for a cluster, and then for ordering the subset of salient states.

In some implementations, a subset of salient states for a cluster may be selected by using classification techniques. For example, a linear classifier may be used to split the states into a subset of salient states and a subset of not salient states. With a linear classifier, each conversation may be represented as a bag-of-states vector (a vector with a length equal to the number of states and where the value of each element is the number of times a corresponding state appears in the conversation). A linear classifier may then be trained to predict the cluster that a conversation belongs to, and the weights of the classifier may be used to determine a salience score for each state. A subset of states may then be selected by comparing the salience scores to a threshold. This process may be repeated for each cluster.

The subset of salient states for cluster may then be ordered to obtain a representative sequence of states for the cluster. In some implementations, an average position (or some other statistic) may be computed for each state of the subset of salient states. For a given conversation, each state may be assigned a position. In some implementations, the position of a state may be the index of the state in the sequence of states (e.g., from 1 to N where N is the number of states of the conversation). In some implementations, the position of a state may be normalized according to the number of states in the sequence. For example, the states may be numbered from 1 to N and the position may be the index divided by the total number of states in the conversation. A state that is $3^{rd}$ in a sequence of 10 may be given a position of 0.3 (3/10), and a state that is third in a sequence of 20 may be given a position of 0.15 (3/20). Accordingly, a position may be assigned to each instance of a state in a conversation, and an average position for a state may be computed as the average of the positions of the state across conversations. The subset of salient states may then be ordered by the average positions of the salient states.

Once the representative sequence of states has been determined for a cluster, a representative message may be determined for each state of the representative sequence of states. The representative message may be chosen from a set of candidate messages. For example, the set of candidate messages may be all messages corresponding to the state (across all clusters) or all messages corresponding to the state of the cluster.

In some implementations, a representative message for a state may be chosen randomly from a set of candidate messages for the state.

In some implementations, a message score may be computed for each message of the set of candidate messages that indicates how well the message represents the state. For example, a message embedding may be computed for each message (as described above), and a message that is closest to the center of the candidate messages (e.g., closest to a cluster centroid or with a smallest average distance to other messages of the state) may be selected as the representative message. For another example, a message score may be computed as a probability of the message given the state of a hidden Markov model, such as the HMM topic model described above.

After obtaining a representative message for each state of the representative sequence of states, the messages may be combined to generate a representative conversation for the cluster.

In some implementations, more than one representative conversation may be generated for a cluster. For example, more than one representative message may be obtained for each state or more than one representative sequence of states may be determined for a cluster.

Presenting Cluster Information

In some implementations, information about the conversation clusters may be presented to a person to allow the person to better understand the types of conversations in the corpus of conversations.

Any appropriate information about clusters may be presented to a person. FIG. 9 illustrates an example of information about clusters that may be presented to a person. In some implementations, summary information about each cluster may be presented to a person. The summary information may include, for example, one or more of a cluster ID, statistics of conversations in the cluster (e.g., the percentage of all conversations that are in the cluster, the percentage of time of conversations in the cluster, the percentage of conversations in the cluster where the customer support issue was resolved, or a percentage customer satisfaction score), or a description of the conversations in the cluster (e.g., generated by a person or automatically generated).

In some implementations, one or more representative conversations may be presented for a cluster. For example, a representative conversation may be included in the table of FIG. 9, or a representative conversation may be presented in response to a user requesting additional information about a cluster.

FIGS. 10A and 10B illustrate example information that may be presented about individual clusters. For example, the information in FIG. 10A or 10B may be presented after a person requests additional information about a cluster. In FIGS. 10A and 10B, the information presented for each cluster includes statistics of the cluster and a representative conversation of the cluster. In some implementations, more than one representative conversation may be shown for a cluster.

The information about the clusters may be used for a variety of purposes. In some implementations, an employee of a company may review the information about the conversation clusters to improve customer service. For example, the person may use the information to improve a training program for customer service representatives. For another example, the company may identify types of conversations between customers and customer service representatives that may be automated and implementing an automated workflow. Automating aspects of customer support may be more convenient for the customer (e.g., may be faster than calling customer support) and may reduce costs for the company. Any appropriate techniques may be used to implement an automated workflow, such as any of the techniques described in U.S. Pat. Nos. 9,715,496, 9,892,414, U.S. patent application Ser. No. 15/894,504, U.S. patent application Ser. No. 16/035,062, or U.S. patent application Ser. No. 16/189,613, each of which are incorporated by reference herein for all purposes.

Implementation

Figure 11:
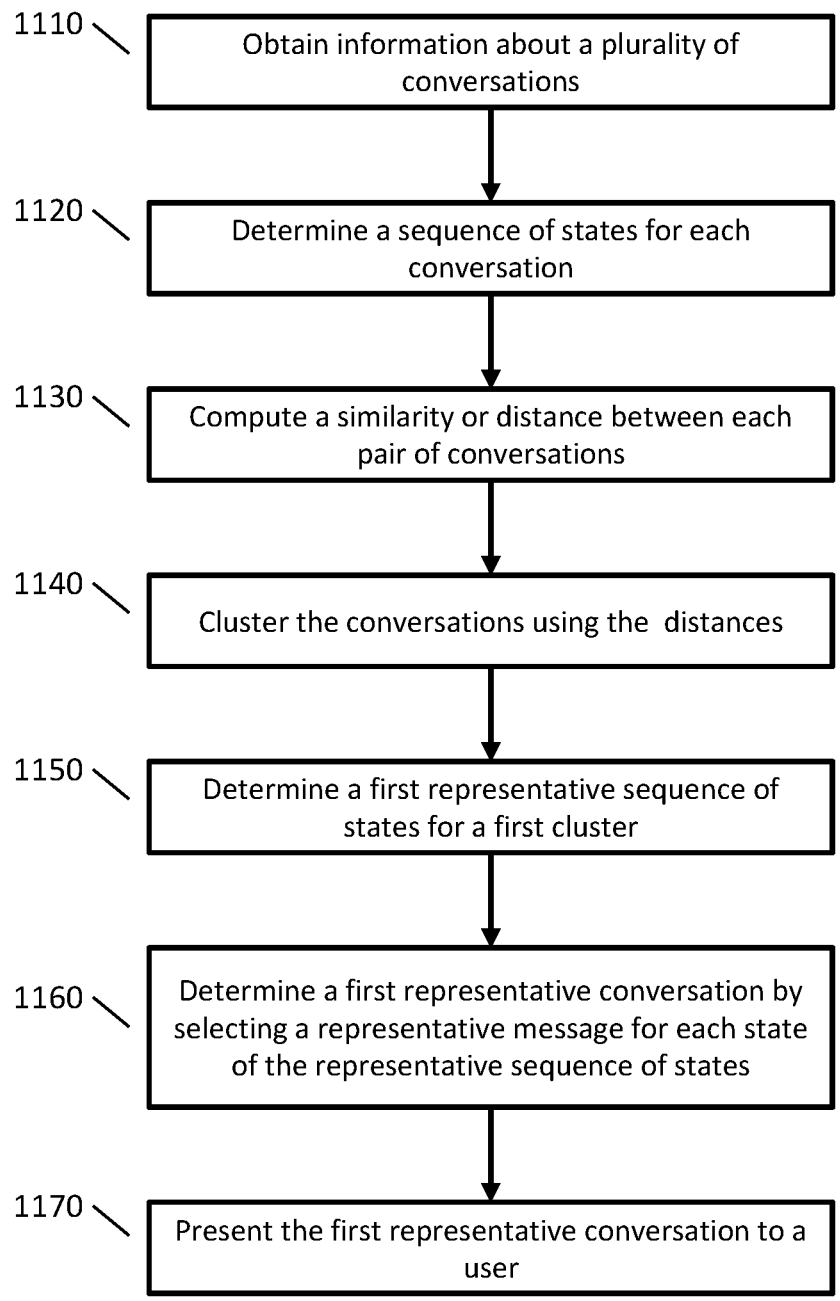
FIG. 11 is an example method for determining one or more representative conversations from a corpus of conversations.

Additional variations and details of determining representative conversations are now described. FIG. 11 is a flowchart of an example method for determining one or more representative conversations from a plurality of conversations.

At step 1110, information about a plurality of conversations is obtained. The conversations may have been conducted using any appropriate technology (e.g., SMS, email, customer support application) and be in any appropriate format (e.g., text or speech). Each conversation may include one or more messages between two users, between more than two users, or between a user and a computing system that provides automated natural language responses to the user. In some implementations, the conversation may be between a user seeking customer support from a company and a customer service representative who is providing support on behalf of a company.

At step 1120, a sequence of states is determined for each conversation. A state may apply to any portion of a conversation, such as a message. A state may represent portions of conversations that have similar meanings or content, such as a state for messages from a customer service representative instructing a user to restart a cable modem. Any appropriate techniques may be used determine a sequence of states for a conversation, such as any of the techniques described herein. For example, the sequence of states may be determined using a hidden Markov model or by computing a message embedding for each message.

At step 1130, a similarity is computed for each pair of conversations using the sequences of states corresponding to the conversations. For example, a similarity or distance between a first conversation and a second conversation may be computed using a first sequence of states for the first conversation and a second sequence of states for the second conversation. Any appropriate similarity or distance may be used, such as an optimal transport distance, a Frechet distance, or a Wasserstein distance.

At step 1140, the conversations are clustered into a plurality of clusters using the distances between each pair of conversations. Any appropriate clustering techniques may be used, such as density-based clustering or hierarchical clustering.

Steps 1150, 1160, and 1170 may be performed for one or more clusters of the plurality of clusters. In some implementations, the steps may be performed for each cluster, and in some implementations, the steps may be performed for a smaller number of clusters, such as one or more clusters selected by a user. Steps 1150, 1160, and 1170 are described for a first cluster, which may be any cluster of the plurality of clusters.

At step 1150, a first representative sequence of states may be determined for the first cluster. Any appropriate techniques may be used determine a first representative sequence of states for the first cluster, such as any of the techniques described herein. In some implementations, a subset of states may be selected as being salient to the conversations of the first cluster using a classifier. The first representative sequence of states may then be determined by ordering the salient subset of states, such as by using an average position of the states.

At step 1160, a first representative conversation for the first cluster is determined using the first representative sequence of states. Any appropriate techniques may be used determine a first representative conversation, such as any of the techniques described herein. In some implementations, first representative conversation may be determined by selecting a representative message for each state of the representative sequence of states.

At step 1170, the first representative conversation may be presented to a user. Other information may also be presented, such as statistics relating to the first cluster. Any appropriate techniques may be used to present the first representative conversation to the user, such as any of the techniques described herein. The user receiving the representative conversation, may use the first representative conversation for any appropriate purpose, such as implementing an automated workflow to automate interactions of the first cluster.

The above process may be repeated, for example, to determine another representative conversation for the first cluster or to determine a representative conversation for a second cluster.

Figure 12:
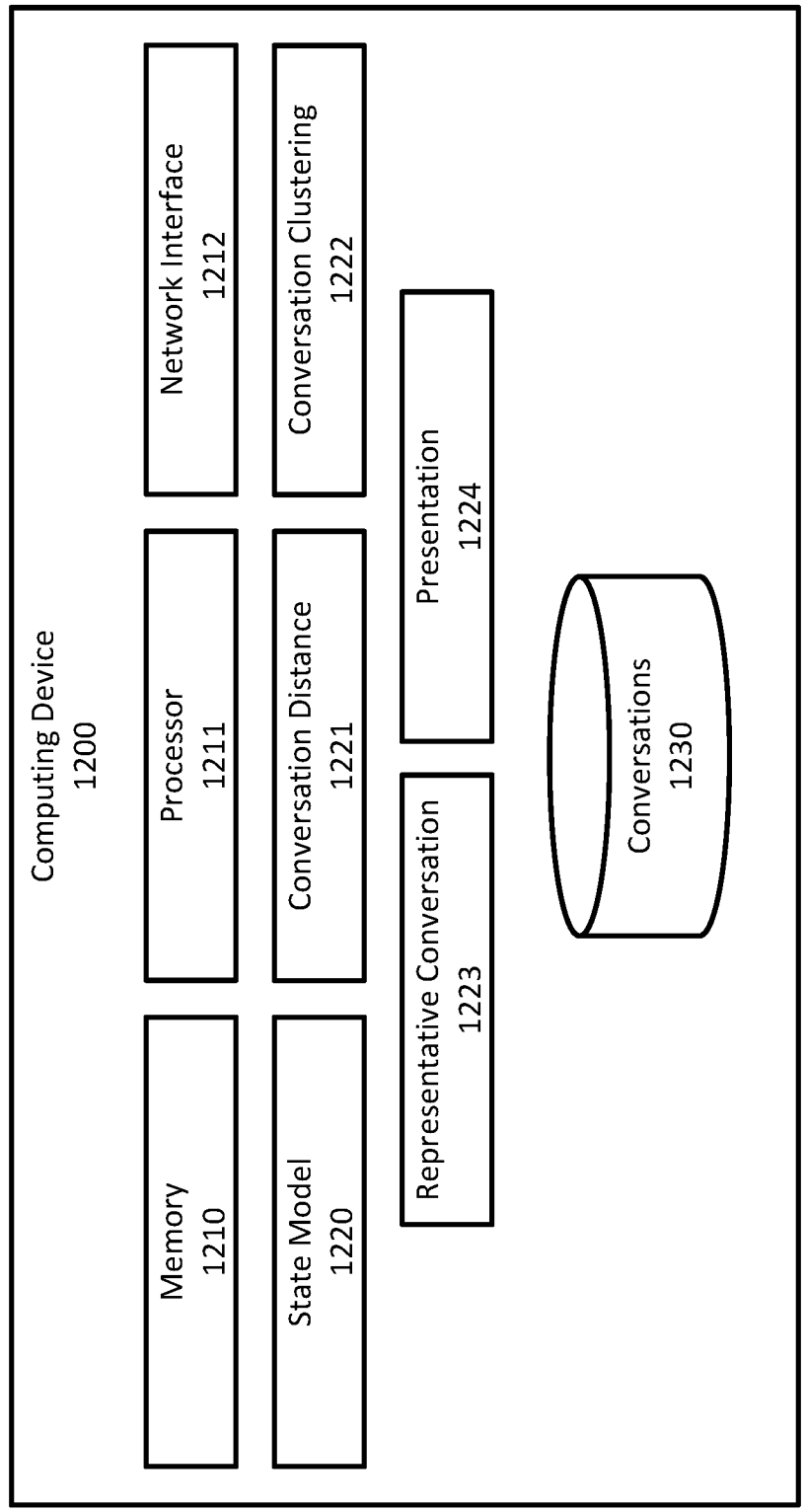
FIG. 12 is an exemplary computing device that may be used to determine one or more representative conversations from a corpus of conversations.

FIG. 12 illustrates components of one implementation of a computing device 1200 for implementing any of the techniques described above. In FIG. 12, the components are shown as being on a single computing device, but the components may be distributed among multiple computing devices, such as a system of computing devices, including, for example, an end-user computing device (e.g., a smart phone or a tablet) and/or a server computer (e.g., cloud computing).

Computing device 1200 may include any components typical of a computing device, such as volatile or nonvolatile memory 1210, one or more processors 1211, and one or more network interfaces 1212. Computing device 1200 may also include any input and output components, such as displays, keyboards, and touch screens. Computing device 1200 may also include a variety of components or modules providing specific functionality, and these components or modules may be implemented in software, hardware, or a combination thereof. Below, several examples of components are described for one example implementation, and other implementations may include additional components or exclude some of the components described below.

Computing device 1200 may have a state model component 1220 that may determine a sequence of states for a conversation using any of the techniques described herein. Computing device 1200 may have a conversation distance component 1221 that may compute a similarity or distance between two conversations using any of the techniques described herein. Computing device 1200 may have a conversation clustering component 1222 that may cluster conversations using any of the techniques described herein. Computing device 1200 may have a representative conversation component 1223 that may determine a representative conversation for a cluster using any of the techniques described herein. Computing device 1200 may have a presentation component 1224 that may present a representative conversation of a cluster to a user using any of the techniques described herein.

Computing device 1200 may include or have access to various data stores. Data stores may use any known storage technology such as files, relational databases, non-relational databases, or any non-transitory computer-readable media. Computing device 1200 may have conversation data store 1230 that may be used to store a corpus of conversations that may be processed using any of the techniques described herein.

It can be seen that various systems, methods, and devices described throughout the present disclosure provide for improvements to operations of one or more computers and/or computing systems. For example, the utilization of clustering and representative messages provides for both a greatly reduced calculation set and memory utilization, as well as a naturally understandable description of clusters for users of the system. Additionally, operations herein using sequences of states as well as clustering of communications provide for reduced memory utilization and processing time for messages, while providing high confidence that clustered messages are related in a subject matter dimension of interest to the system user, administrator, or manager.

It can be seen that various systems, methods, and devices described throughout the present disclosure provide for improvements to the technology areas of: implementing a customer support system (including, e.g., an automated or automation assisted customer support system); analysis of collections or groups of conversations in any context (e.g., implementing a training system, a registration system, and/or a service interface system); and/or analyzing and/or providing improvement recommendations for a large data set having natural language interactions as at least a part of the large data set. Embodiments throughout the present disclosure provide for a high reliability and readily understandable interface for a user, administrator, and/or manager of a communication system to determine whether the goals of the communication system are being met, to measure improvements on a continuing basis, and/or to determine if communication updates and/or training are desirable. Embodiments throughout the present disclosure provide rapid and highly reliable information to characterize functionally similar conversations, even where conversations having a similar underlying subject matter vary widely in the language utilized, the length of the conversation, the amount of extraneous content in the conversation, and/or the order or progression of the conversation through relevant topics.

It can be seen that various systems, methods, and devices described throughout the present disclosure set forth practical applications for analyzing a number of communications such as a number of conversations between users and/or between a user and a natural language communication system such as an automated or partially automated customer support system, training system, registration system, and/or service interface system. Example systems, methods, and devices disclosed herein provide for clustering of conversations and communications, determinations of representative conversations or communications for the clusters, determinations of representative messages for the conversations, and a ready user interface to facilitate analysis, metrics, and/or improvements of the communication system. Example and non-limiting analysis, metrics, and/or improvements include: determining whether goals of the communication system have been or are being met, determining whether user experiences with the communication system are satisfactory and/or can be improved, and/or to train users of the communication system to improve outcomes.

The methods and systems described herein may be deployed in part or in whole through a machine that executes computer software, program codes, and/or instructions on a processor. "Processor" as used herein is meant to include at least one processor and unless context clearly indicates otherwise, the plural and the singular should be understood to be interchangeable. Any aspects of the present disclosure may be implemented as a computer-implemented method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A computer-implemented method for identifying a representative conversation from a plurality of conversations, the method comprising:
    obtaining information about the plurality of conversations, wherein each conversation comprises one or more messages;
    determining a sequence of states for each conversation by assigning a state to each message of each conversation, wherein a state represents messages with similar meanings;
    computing a distance between each pair of conversations of the plurality of conversations, wherein computing a distance between a first conversation and a second conversation comprises computing a distance between a first sequence of states corresponding to the first conversation and a second sequence of states corresponding to the second conversation;
    clustering the plurality of conversations into a plurality of clusters using the distances between each pair of conversations;
    determining a first representative sequence of states for a first cluster by processing conversations of the first cluster; and
    determining a first representative conversation for the first cluster by selecting a representative message for each state of the first representative sequence of states; and
    presenting the first representative conversation to a user.

2. The computer-implemented method of claim 1, wherein obtaining the sequence of states for each conversation comprises training a hidden Markov model.

3. The computer-implemented method of claim 2, wherein training the hidden Markov model comprises computing a distribution over topics for each state of the hidden Markov model.

4. The computer-implemented method of claim 1, wherein clustering the plurality of conversations comprises using density-based clustering or hierarchical clustering.

5. The computer-implemented method of claim 1, wherein determining the first representative sequence of states for the first cluster comprises:
    selecting a first plurality of states corresponding to the first cluster; and
    ordering the first plurality of states.

6. The computer-implemented method of claim 5, wherein selecting the first plurality of states comprises using a linear classifier.

7. The computer-implemented method of claim 5, wherein ordering the first plurality of states comprises computing a position for each state of the first plurality of states and ordering the first plurality of states using the position for each state of the first plurality of states.

8. The computer-implemented method of claim 1, comprising:
    determining a second representative sequence of states for a second cluster by processing conversations of the second cluster;
    determining a second representative conversation for the second cluster by selecting a representative message for each state of the second representative sequence of states; and
    presenting information about the second representative conversation to the user.

9. The computer-implemented method of claim 8, wherein presenting the information about the second representative conversation to the user comprises at least one operation selected from the operations consisting of:
    presenting the second representative conversation to the user;
    presenting a statistic of the second cluster to the user;
    presenting the second representative sequence of states to the user; and
    presenting summary information about the second cluster to the user.

10. A system for identifying a representative conversation from a plurality of conversations, the system comprising:
    at least one server computer comprising at least one processor and at least one memory, the at least one server computer configured to:
        obtain information about the plurality of conversations, wherein each conversation comprises one or more messages;
        determine a sequence of states for each conversation by assigning a state to each message of each conversation, wherein a state represents messages with similar meanings;
        compute a distance between each pair of conversations of the plurality of conversations, wherein computing a distance between a first conversation and a second conversation comprises computing a distance between a first sequence of states corresponding to the first conversation and a second sequence of states corresponding to the second conversation;
        cluster the plurality of conversations into a plurality of clusters using the distances between each pair of conversations;
        determine a first representative sequence of states for a first cluster by processing conversations of the first cluster; and determine a first representative conversation for the first cluster by selecting a representative message for each state of the first representative sequence of states; and present the first representative conversation to a user.

11. The system of claim 10, wherein the at least one server computer is configured to:

determine a second representative sequence of states for the first cluster by processing conversations of the first cluster;

determine a second representative conversation for the first cluster by selecting a representative message for each state of the second representative sequence of states; and present information about the second representative conversation to the user.

12. The system of claim 10, wherein the at least one server computer is configured to:

compute a message embedding for a plurality of messages of the plurality of conversations;

cluster the message embeddings into a second plurality of clusters; and wherein each state corresponds to a cluster of the second plurality of clusters.

13. The system of claim 10, wherein the at least one server computer is configured to present summary information about each cluster of the plurality of clusters to the user.

14. The system of claim 13, wherein the at least one server computer is configured to present the information about the first representative conversation to the user in response to a request from the user.

15. The system of claim 10, wherein the at least one server computer is configured to implement an automated workflow to automate interactions of the first cluster.

16. The system of claim 10, wherein the at least one server computer is configured to select a representative message for a state by selecting a message corresponding to a highest probability for the state.

17. The system of claim 10, wherein the at least one server computer is configured to compute the distance between the first sequence of states and the second sequence of states by computing a Frechet distance or a Wasserstein distance.

18. One or more non-transitory, computer-readable media comprising computer-executable instructions that, when executed, cause at least one processor to perform actions comprising:

obtaining information about a plurality of conversations, wherein each conversation comprises one or more messages;

determining a sequence of states for each conversation by assigning a state to each message of each conversation, wherein a state represents messages with similar meanings;

computing a distance between each pair of conversations of the plurality of conversations, wherein computing a distance between a first conversation and a second conversation comprises computing a distance between a first sequence of states corresponding to the first conversation and a second sequence of states corresponding to the second conversation;

clustering the plurality of conversations into a plurality of clusters using the distances between each pair of conversations;

determining a first representative sequence of states for a first cluster by processing conversations of the first cluster; and determining a first representative conversation for the first cluster by selecting a representative message for each state of the first representative sequence of states; and presenting the first representative conversation to a user.

19. The one or more non-transitory, computer-readable media of claim 18, wherein each conversation corresponds to a customer support session between a customer and a customer service representative.

20. The one or more non-transitory, computer-readable media of claim 18, wherein obtaining the sequence of states for each conversation comprises processing a bag-of-words feature vector for each message of the plurality of conversations.

21. The one or more non-transitory, computer-readable media of claim 18, the actions comprising presenting a statistic of the first cluster to the user.

* * * * *